US005481545A

United States Patent [19]
Maedjaja et al.

[11] Patent Number: 5,481,545
[45] Date of Patent: Jan. 2, 1996

[54] CONVENTIONAL NETWORK INTERFACE FOR MULTISITE RF TRUNKING SYSTEM

[75] Inventors: Samuel Maedjaja; Houston H. Hughes, III, both of Lynchburg, Va.

[73] Assignee: Ericsson Inc., Research Triangle Park, N.C.

[21] Appl. No.: 749,534

[22] Filed: Aug. 26, 1991

[51] Int. Cl.$^6$ ................................................. H04J 3/16
[52] U.S. Cl. ................................... 370/95.1; 455/17
[58] Field of Search ..................... 370/110.1, 110.3, 370/95.1, 95.3, 97, 75, 76; 340/825.44, 825.48; 455/15, 17, 53.1, 33.1, 33.2, 33.2, 33.4, 35.1, 36.1, 7

[56] References Cited

U.S. PATENT DOCUMENTS

| | | | |
|---|---|---|---|
| 4,012,597 | 3/1977 | Lynk, Jr. et al. | 455/542 |
| 4,188,582 | 2/1980 | Cannalte et al. | 455/51.2 |
| 4,268,722 | 5/1981 | Little et al. | 370/18 |
| 4,451,827 | 5/1984 | Kahn et al. | 370/60 |
| 4,550,402 | 10/1985 | Gable et al. | 370/85.11 |
| 4,553,262 | 11/1985 | Coe | 455/15 |
| 4,578,815 | 3/1986 | Persinotti | 455/15 |
| 4,590,467 | 5/1986 | Lare | 370/852 |
| 4,630,263 | 12/1986 | Townsend et al. | 370/90 |
| 4,635,253 | 1/1987 | Urui et al. | 570/67 |
| 4,698,805 | 10/1987 | Sasuta et al. | 455/17 |
| 4,723,264 | 2/1988 | Sasuta et al. | 379/59 |
| 4,787,081 | 11/1988 | Waters et al. | 370/67 |
| 4,792,948 | 12/1988 | Hangen et al. | 370/58.3 |
| 4,926,495 | 5/1990 | Comroe et al. | 370/85.1 |
| 5,208,811 | 5/1993 | Kashio et al. | 370/110.1 |
| 5,241,537 | 8/1993 | Gulliford et al. | 370/67 |
| 5,265,262 | 11/1993 | Grube et al. | 455/56.1 |

FOREIGN PATENT DOCUMENTS

| | | |
|---|---|---|
| 0473355 | 8/1991 | European Pat. Off. . |
| 2075799 | 11/1981 | United Kingdom . |
| WO91/16797 | 10/1991 | WIPO . |

OTHER PUBLICATIONS

Motorola Field Maintenance Manual 68P81063E60–A, "CENTRACOM Series II Control Center Systems" (1985).

Primary Examiner—Douglas W. Olms
Assistant Examiner—Ajit Patel
Attorney, Agent, or Firm—Nixon & Vanderhye

[57] ABSTRACT

A gateway between a non-trunked ("conventional") RF communication system and digitally trunked RD communication system maps between trunked group IDs and non-trunked subaudible signalling tone frequencies. An interface between the two systems thus forms a "super group" including both trunked and non-trunked radios that can automatically communicate together. The gateway permits a customer to continue to use non-trunked components, and to cost-effectively integrate such components into a state-of-the-art trunked radio communications system.

23 Claims, 7 Drawing Sheets

Fig. 1

| CG TONE (1) | GROUP ID (1) | 502 |
| CG TONE (2) | GROUP ID (2) | 504 |
| CG TONE (3) | GROUP ID (3) | 506 |
| • | | |
| CG TONE (N) | GROUP ID (N) | |

Fig. 5
MAPPING TABLE

Fig. 2 MULTI-SITE ARCHITECTURE

| Fig. 2A | Fig. 2B |

Fig. 2A MULTI-SITE ARCHITECTURE

Fig. 2B MULTI-SITE ARCHITECTURE

Fig. 6
(NON-TRUNKED PTT)

Fig. 7
(GROUP CHANNEL RQST. MSG. RECEIVED)

CONVENTIONAL NETWORK INTERFACE FOR MULTISITE RF TRUNKING SYSTEM

CROSS-REFERENCE TO RELATED APPLICATIONS

This application is related to commonly-assigned patent application Ser. No. 07/709,987 entitled "Conventional Base Station Interface Architecture For RF Trunking Multisite Switch", filed on 4 Jun. 1991 in the name of Gulliford et al, now U.S. Pat. No. 5,241,537 issued Aug. 31, 1993.

This application is also related to the following additional commonly-assigned copending patent applications (all incorporated by reference herein):

Ser. No. 07/658,799 filed Feb. 22, 1991 entitled "Distributed Multisite Coordination System" filed on 28 Aug. 1990 in the name of Teel, now abandoned;

Ser. No. 07/658,844 filed Feb. 22, 1991 entitled "Distributed Multisite Switch Architecture"; and Ser. No. 07/658,636 filed Feb. 22, 1991 entitled "Audio Routing Within a Trunked Radio Frequency Multisite Switch."

FIELD OF THE INVENTION

The present invention relates to trunked RF communications systems. More particularly, the present invention relates to an arrangement for interfacing a non-trunked RF base station with a digitally trunked RF communications system. Still more particularly, the present invention relates to interfaces between a non-trunked ("conventional") RF base station (e.g., of the type using CTCSS channel guard signalling to provide selective squelch functions) with a digital trunking network/switch.

BACKGROUND AND SUMMARY OF THE INVENTION

So-called "conventional" (i.e., non-trunked) RF repeaters and associated communications systems have provided reliable, cost-effective communications for mobile and portable RF transceiver users. As those skilled in the art know, non-trunked RF base stations repeat (or relay), on a given output frequency, signals received on a given input frequency. In such systems, user transceivers (e.g., mobile units installed in vehicles, and portable units carried on tile person) in the field transmit RF signals on the repeater's input frequency and receive RF signals on the repeater output frequency). Since the base station typically has much higher effective radiated power than the mobiles and portables, the "talk range" of each individual user is increased substantially without requiring the individual users to have high power equipment. Such "conventional" RF repeater systems provide cost-effective, reliable RF communications to many thousands of RF transceiver users.

As those skilled in this art know, the "squelch" circuit of an RF receiver acts as a gate that selectively permits audio received by the receiver to pass the receiver audio output. When the squelch is open, the signal passes; when squelch is closed, the signal is blocked. As will be explained, many such conventional base station systems provide limited call privacy, access control and "frequency sharing" features by using so-called "channel guard" CTCSS "selective squelch" subaudible audio tones to control squelch circuits throughout the communications system.

In "selective squelch" equipped RF repeater/base station systems, each user RF transceiver is provided with a subaudible tone generator and a subaudible tone decoder. A subaudible tone is continually impressed (modulated) on the carrier of each of the user transceiver transmissions for the duration of transmission (since the tones are subaudible, they occupy audio frequencies that are below those audio frequencies used for voice communication—and hence do not interfere or overlap with the voice communication signals carried by the same RF carrier).

The non-trunked base station has its own subaudible tone decoder which decodes the particular subaudible audio frequencies transmitted by the user transceivers. Upon receiving a carrier modulated by a subaudible tone at the appropriate frequency is impressed, the base station opens its receiver squelch and permits the received audio signal (including the subaudible tone) to be retransmitted (or possibly regenerated) by the repeater transmitter. On the other hand, if a signal received by the base station does not include the appropriate subaudible tone, the base station receiver squelch remains closed and the received signal is not repeated. This arrangement thus prevents all but those transceivers equipped to generate the appropriate subaudible tone from "accessing" the communications system.

Similarly, the receiver section of a user transceiver opens its squelch (permitting received audio to be amplified and passed to a loudspeaker) only when it receives an RF carrier modulated by the appropriate subaudible tone (the user transceiver typically also filters out the subaudible signals from the audio provided to the loudspeaker to prevent very low frequency sounds from being generated in response to the tones). User transceivers effectively ignore received signals that do not include the appropriate subaudible signals—thus relieving the user from continually hearing other people's conversations.

There are several different standard CTCSS tone frequencies ranging from about 60 Hz to about 250 Hz or so. These tone frequencies are standardized to facilitate equipment compatibility between different manufacturers. It is possible to have different groups of user transceivers (e.g., the road maintenance crew and the trash collection crew of a county government) share the same RF base station and associated RF channel by having the different transceiver groups operate using different CTCSS frequencies. The road maintenance crew, for example, can be provided with transceivers having tone generators and decoders that operate at a first CTCSS frequency; and the transceivers used by the trash collection crew can have tone generators and decoders that operate at a second CTCSS frequency different from the first frequency. The common base station opens squelch in response to receipt of either CTCSS frequency. In this way, the road maintenance crew is only disturbed by transmissions originating from other road maintenance crew transceivers; and similarly, the trash collection crew only hears transmissions originating from other trash collection crew transceivers. So long as the different groups comprise relatively infrequent users, the groups are able to share the same channel and associated base station without substantial interference with one another. In addition, the selective squelch arrangement provides a degree of privacy between different groups of users.

So-called "trunked" RF communications systems provide for a more efficient way of sharing RF channels among multiple user transceivers—and thus provide certain advantages over conventional non-trunked systems. For example, trunking increases channel utilization by permitting efficient time-sharing of channels by different users or groups of users. In many trunked RF systems (e.g., the "DAC Multi-site" systems made by Ericsson-GE, the assignee of the subject application), user radios are temporarily "assigned" to RF working channels only while they are engaged in active communications, and monitor a digital control channel at all other times. Such exemplary digital trunking systems provide call privacy in addition to more efficient frequency utilization (since only user radios that are actively involved in a particular communique are "assigned" to the RF channel carrying that communique—and then only for the duration of the communique). "Digitally trunked" communications systems are also capable of providing a wide range of advanced features (e.g., dynamic regrouping, capability to transmit digital data over the RF channels, etc.) not provided in prior "conventional" non-trunked systems. Such capabilities make trunked systems the systems of choice for many new equipment acquisitions.

Purchasing new digitally trunked equipment to support a digitally trunked communications system is often expensive, but it can be even more expensive if all of the customer's radio equipment must be replaced in order for any of the customer's user to take advantage of digital trunking. A customer who has been operating a conventional system for awhile typically has devoted substantial resources to the equipment and training associated with his conventional system. Unfortunately, non-trunked CTCSS type user transceivers and base stations are generally incompatible with state-of-the-art digitally trunked communications systems. A customer thinking about purchasing a digitally trunked system but having an already installed conventional system is typically very worried about whether the new system will make his existing system obsolete. There is thus a great need to design digitally trunked communications systems such that existing tone-driven conventional equipment is at least partially compatible and/or can be integrated with newly purchased state-of-the-art digitally trunked RF communications systems and components.

Suppose, for example, a county government that uses a radio repeater system to support the communications of a variety of different governmental services (e.g., police, fire, paramedics and ambulances, trash removal, road maintenance, building inspectors, etc.). Most county governments have used radio repeater systems in one form or another for many years, and may have purchased (and continue to operate successfully) "conventional" (non-trunked) RF repeater ("base") stations and associated transceivers. The county may contemplate "upgrading" its RF communications system such that the advantages and features provided by digitally trunked components can be made available to its more critical services (e.g., police, fire, ambulance). However, the county may be unwilling to spend the additional money necessary to provide digitally trunked equipment for its less critical services (e.g., trash collection, building inspectors). While it is possible to maintain the two systems (digitally trunked, and conventional) side by side (providing a human interface in the form of a dispatcher between the two incompatible systems), it would be highly desirable to provide at least a limited automatic interconnection or link between the two systems such that calls handled by the digitally trunked system could also be routed to and/or from the conventional system.

Moreover, there is now a trend toward creating networks of digitally trunked repeater stations (see, for example, the earlier filed copending patent applications identified in the "Cross-Reference to Related Applications" section of this patent application). Such networks provide great advantages by coordinating RF communications across multiple RF repeater sites. It would be highly desirable to be able to integrate conventional non-trunked base stations into such network arrangements.

Unfortunately, it is difficult to provide compatibility or integration between a digitally trunked network and a conventional base station. Conventional base stations typically are controlled by analog voltage levels and/or via audio tones of specified frequencies. Such voltage and/or tone control is generally incompatible with digitally trunked switches (which may, for example, use serial data communications busses and associated protocols for controlling base stations). In addition, a digitally trunked system typically designates and/or identifies RF transceivers in the field with multi-bit digital identification numbers (e.g., in EGE's DAC system, individual radio transceivers are assigned unique digital identifiers). Such digital identification is generally incompatible with CTCSS type selective squelch systems (as described above) which use analog audio tones to specify groups of radio transceivers.

Commonly-assigned U.S. Pat. No. 5,241,537 entitled "Conventional Base Station Interface Architecture For RF Trunking Multisite Switch"; describes one attempt to provide such integration. Although the Gulliford et al. patent application has an effective filing date which is prior to the subject application, it may not be prior art against the subject invention. In any event, the Gulliford et al disclosure is referenced as being an example of one approach for providing an interface between a conventional base station and a digitally trunked RF communications system. Gulliford et al describe, in their patent application, a technique for interfacing plural conventional base stations with a multi-site RF trunking switch/network through a "CVIM". This CVIM includes, in their described preferred embodiment, a controller module and backup controller module; and plural audio modules. Special purpose messages may be directed to the CVIM in the Gulliford et al arrangement to provide certain functionality. While the Gulliford et al arrangement has been highly successful in its own right, it may not provide a cost-effective solution to certain customers who wish to interface only one (or a very small number) of conventional base stations to their digital trunking system.

Thus, a need exists for a cost-effective, relatively simple arrangement for interfacing a conventional (i.e., non-trunked) RF base station with a digitally trunked radio communications system. It would be highly desirable if such an interfacing arrangement were capable of providing interfacing for conventional base stations of various configurations (e.g., made by different manufacturers) to facilitate integration of a wide variety of existing customer equipment with state-of-the-art digitally trunked radio communications systems.

The present invention, in accordance with one of its aspects, facilitates communications and interactions between: (a) conventional RF repeater systems using sub-audible tone signalling; and (b) a digitally trunked RF communications system (e.g., EGE's DAC system). The conventional network interface provided by the present invention might be regarded as a "gateway" between the digitally trunked switch and a non-trunked tone-operated system.

In accordance with one aspect of a feature provided by the present invention, an interface between a non-trunked RF base station and a digitally trunked RF communications system provides mapping between subaudible tone frequencies and transceiver digital identifiers. The interface may, for example, map a so-called "group identification" digital value provided by the digitally trunked system into a particular subaudible tone frequency produced by the conventional base station—and vice versa. Thus, it becomes possible to define a "super group" including both digitally trunked user transceivers and non-trunked, selective squelch tone controlled user transceivers—and to conveniently handle communications to/from all of the user transceivers within such "super group" automatically within the same integrated RF communications system.

Thus, the present invention may facilitate communications between radios from specific Groups within the EGE wide band and narrow band DAC systems and conventional non-trunked radios using specific subaudible frequencies.

BRIEF DESCRIPTION OF THE DRAWINGS

These and other features and advantages of the present invention will become better and more completely understood by referring to the following detailed description of a presently preferred exemplary embodiment in conjunction with the drawings, of which.

DETAILED DESCRIPTION OF A PRESENTLY PREFERRED EXEMPLARY EMBODIMENT

Figure 1:
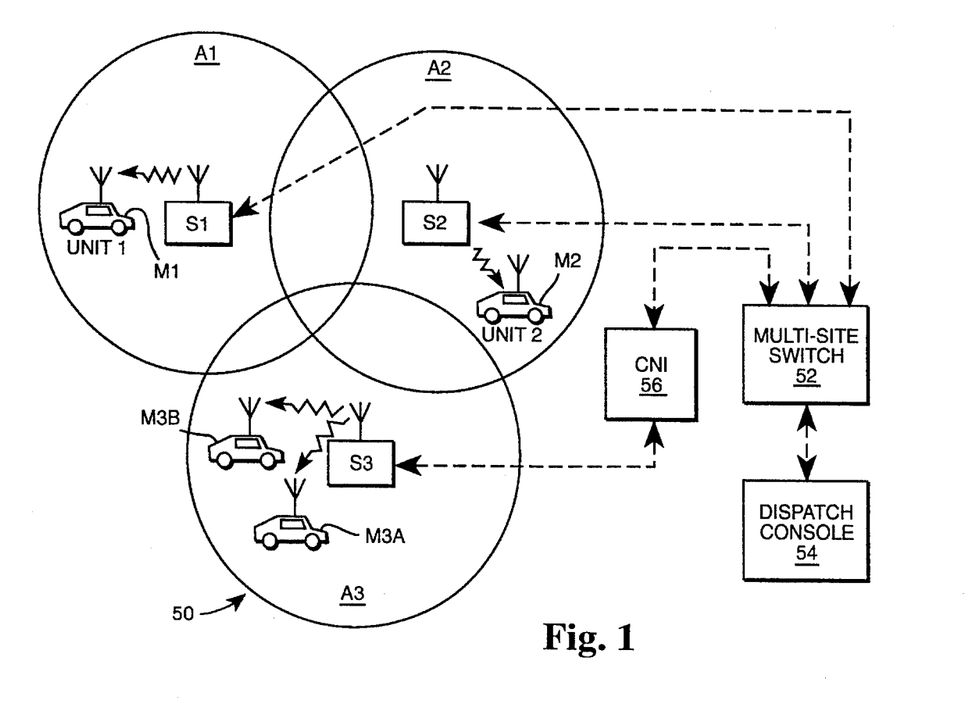
FIG. 1 is an overall high level schematic diagram of exemplary RF communication system in accordance with the presently preferred exemplary embodiment of the present invention, this RF communications system including both digitally trunked and non-trunked user transceivers and repeaters.

FIG. 1 schematically shows an overall exemplary RF communications system 50 including trunked and non-trunked elements. System 50 in the preferred embodiment may, for example, comprise a multisite switch 52 and associated dispatch console 54 manufactured by Ericsson-GE Mobile Communications of Lynchburg, Va. Such multisite switch 52 may, in the exemplary system shown, interact, communicate with and control digitally trunked RF repeater sites S1 and S2.

Such digitally trunked repeater sites S1 and S2, in turn, facilitate digitally trunked RF communications with digitally trunked radio transceivers ("radios") M1 and M2. As will be understood, trunked sites S1,S2 typically communicate with many (e.g., hundreds) of digital radios. Radios M1, M2 are shown merely for purposes of illustration; in an actual system, many digital radios would be served by each of sites S1,S2.

User transceivers M1, M2 may be mobile or portable radio transceivers, for example, and typically include microprocessors or other digital controllers which are capable of receiving, processing and generating digital control signals. Details concerning the digital trunking functions provided by digitally trunked sites S1,S2 in cooperation with user transceivers M1,M2 are well known to those of ordinary skill in the art, and need not be repeated here. For more information, please refer to the copending patent applications cited in the "Field of the Invention" section of this patent application; and publicly-available literature published by Ericsson-GE describing its digitally trunked RF communications systems.

In the exemplary FIG. 1 embodiment shown, site S3 comprises a "conventional" (i.e., non-trunked) RF base station/repeater. Site S3, for example, may comprise a "MASTR II," "MASTR IIe" or "MASTR III" base station or derivatives manufactured by Ericsson-GE Mobile Communications, for example (or alternatively may comprise a conventional base station manufactured by a vendor other than Ericsson-GE). Site S3 serves one or more non-trunked user transceivers (shown schematically as M3A, M3B in FIG. 1).

As will be understood by those skilled in this art, conventional base station S3 provides no trunking capabilities in the preferred embodiment. Rather, base station S3 repeats on its output frequency the signals it receives on its input frequency. However, in the preferred embodiment, base station S3 and conventional user transceivers M3 provide "selective squelch" capability using CTCSS subaudible tones modulated on respective carriers.

CTCSS tone generation and decoding and the use of these tones to provide selective squelch capabilities are well known to those skilled in this art. Briefly, however, each conventional (non-trunked) transmission includes a "channel guard" (a band of audio frequencies that lies below those frequencies used for voice communications). Subaudible tones of standard frequency (e.g., in the range of 60 Hz and slightly less than 300 Hz) are used in the preferred embodiment to selectively gate receiver squelches of base station S3 and user transceivers M3. Such selective squelch is used in the preferred embodiment to direct different transmissions to different conventional user transceivers—even though all user transceivers M3 continually monitor the same base station S3 output frequency. For example, a subset of conventional user transceivers M3a may be designed or programmed to open squelch only upon receiving an RF carrier having a particular subaudible tone frequency F1 modulated thereon. Conventional user transceivers M3b may similarly be designed or programmed to open squelch only upon receipt of a carrier having subaudible tone of frequency F2 (F2 not equal to F1) modulated thereon (in one exemplary arrangement, for example, tone frequency F1 may be 100 Hz, and tone frequency F2 may be 156.7 Hz). In this way, it is possible to direct particular transmissions from base station S3 to either user transceivers 3a or user transceivers M3b by simply modulating the base station carrier with the appropriate subaudible tone frequency F1 or F2. Those of ordinary skill in this art are well acquainted with CTCSS tone frequencies. If desired, it is possible to use frequencies other than standard CTCSS frequencies (e.g., if a non-standard system can be tolerated or is desired).

Preferred embodiment system 50 further includes conventional network interface (CNI) 56 (the term "conventional" as used herein does not mean or refer to "prior art", but rather is used consistently with usage by those of ordinary skill in the art to distinguish from "trunked"). Conventional network interface 56 interfaces non-trunked site S3 with digitally-trunked multisite switch 52 and associated digitally-trunked RF sites S1,S2. CNI 56 provides conversion between digital signals and analog tone control signals, and also provides additional functionality which permits non-trunked user transceivers M3a,M3b to be associated with "groups" of digitally-trunked user RF transceivers (e.g., M1,M2).

As is well known by those skilled in this art, digitally trunked user transceivers M1,M2 are typically each assigned a unique multibit digital identifier commonly referred to as an "individual ID." It is possible for system 50 to establish contact with an individual digitally-trunked transceiver by transmitting appropriate channel assignment signals specifying its "individual ID" over a digital control channel.

More typically, however, RF communications is established between groups of user transceivers involved in common activities (e.g., all user transceivers for the Cherrydale Fire Station; all user transceivers within the detective division of the police department; all portable transceivers used by the sheriff's department; etc.). Typically, then, each digitally-trunked user transceiver may also be programmed to respond to one or more "Group ID" identifiers. Group IDs are, like individual IDs, multibit digital values (although for efficiency purposes group IDs typically have fewer bits than the individual ID associated with a typical digitally-trunked radio transceiver). Plural transceivers are usually defined within the same group such that a single channel assignment message specifying a particular group ID will cause all transceivers within that group to begin operating on a common (or networked) RF working channel (such that communications can occur between all members of that group).

CNI 56 in the preferred embodiment associates groups of digitally-trunked user transceivers with particular non-trunked (tone-based) user transceivers. Suppose, for purposes of illustration, that digitally-trunked user transceiver M1 comprises several transceivers all having a common group ID. Although M1 is depicted in FIG. 1 as being within the coverage area A1 of trunked site S1, different transceivers within the same group may be found within the coverage areas of several different digitally-trunked sites and yet still all be collected together by multisite switch 52 to permit participation within a common communiqué. In the preferred embodiment, CNI 56 may associate a plurality of non-trunked transceivers M3a (all responding to the same subaudible selective squelch tone) with digitally-trunked transceiver group M1. More particularly, in the preferred embodiment, CNI 56 provides a mapping between the digital group ID corresponding to trunked transceiver group M1 and the subaudible tone frequency used by non-trunked transceivers M3b.

As an example, suppose that one of non-trunked transceivers M3b begins transmitting. As in prior art non-trunked system, non-trunked site S3 receives the M3b transceiver transmission and decodes the subaudible tone modulated thereon (suppose this subaudible tone is at frequency F2). Since conventional base station S3 has been designed and/or programmed to respond to subaudible tone F2, the base station opens its squelch and repeats on its output frequency the transmission of the calling transceiver M3b. All other monitoring non-trunked transceivers M3b within the coverage area of base station S3 receive and decode such subaudible tone and open their squelches to permit their users to hear the transmission (e.g., on loud speakers). Montoring transceivers M3A (which respond to a different subaudible tone frequency F1) receive the transmission, but these transceivers do not open squelch such that their users are not disturbed by and never hear the transmission of the M3B calling transceiver.

In the preferred embodiment, CNI 56 performs the subaudible tone decode and encode processes for non-trunked base station S3. Once CNI 56 determines that the received subaudible tone corresponds to an "authorized" tone, it performs a mapping function (e.g., using a lookup table of the type shown in FIG. 5 herein) to "map" the received subaudible tone into a digital group ID used by the digitally-trunked portion of system 50.

If CNI 56 has been preprogrammed to associate transceivers M3b with digitally-trunked user transceivers, CNI 56 will provide a digital group ID as a result of this mapping process. CNI 56 provides this digital group ID to multisite switch 52 in the form of a group channel assignment message of the type carried by the multisite switch. Multisite switch 52, in turn, treats this group channel assignment message in the same way it treats channel assignment messages generated by digitally-trunked site (i.e., it generates channel request messages to each of the digitally-trunked sites for possible channel assignment action). CNI 56 and its associated base station S3 and transceivers M3B in some sense "look like" to multisite switch 52 as an individual calling digitally trunked transceiver.

Assuming, for purposes of illustration, that user transceiver M1 is designated by this group ID provided by CNI 56, trunked site S1 will receive the group channel request message and, in response transmit a channel assignment message over the RF control channel monitored by user transceiver M1 so as to cause user transceiver M1 to move to an RF working channel. CNI 56 also establishes (in cooperation with multisite switch 52) audio routing paths to route the audio output of base station S3 to the input of digitally-trunked site S1 (and vice versa). Thus, CNI permits digitally-trunked user transceivers M1 to participate in communications initiated by non-trunked user transceivers serviced by non-trunked base station S3.

In a similar manner, suppose that digitally-trunked user transceiver M1 initiates a call. Multisite switch 52 in the preferred embodiment receives the group ID contained within a group channel assignment message propagated through the switch 52 in response to a digital channel request message transmitted (over the RF link) by digitally-trunked user transceiver M1. Multisite switch 52 passes this group ID (and the rest of the associated group channel request message) to CNI 56. CNI 56 checks its lookup table to determine whether a mapping needs to occur to any of the non-trunk transceivers serviced by non-trunked base station S3. Since (in the example being described) non-trunked user transceivers M3b are associated with the digitally-trunked group of transceivers M1, CNI 56 maps the group ID it receives into appropriate subaudible tone frequencies (F2) corresponding to non-trunk user transceivers M3b; generates this subaudible tone; and controls non-trunk base station S3 to begin transmitting with the subaudible tone F2 modulated on its carrier. Also, CNI 56 in cooperation with multisite switch 52 provides audio routing between digitally trunked site S1 and non-trunked site S3. Thus, non-trunk user transceivers M3b are able to participate in a call initiated by trunked user transceivers M1.

Figure 2:
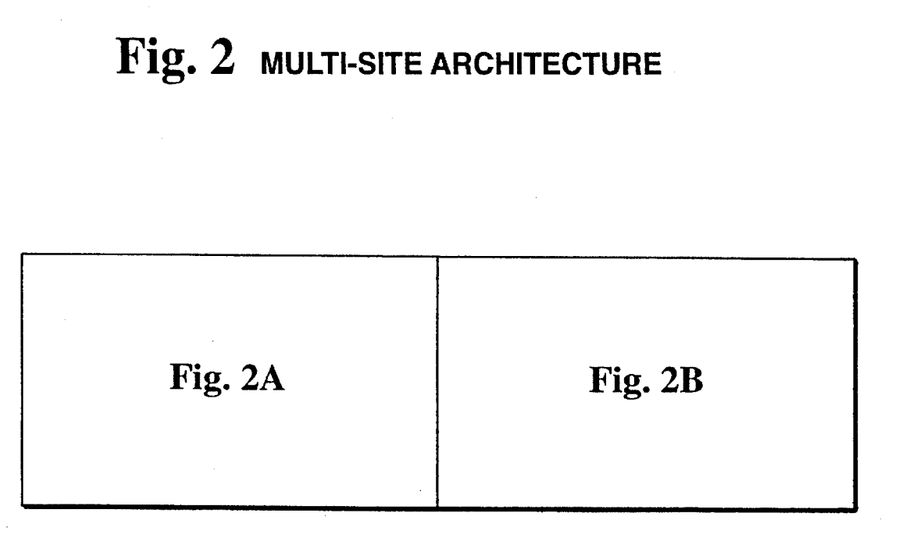
FIGS. 2A & 2B are a more detailed exemplary block diagram of the architecture for the system shown in FIG. 1.
Figure 2A:
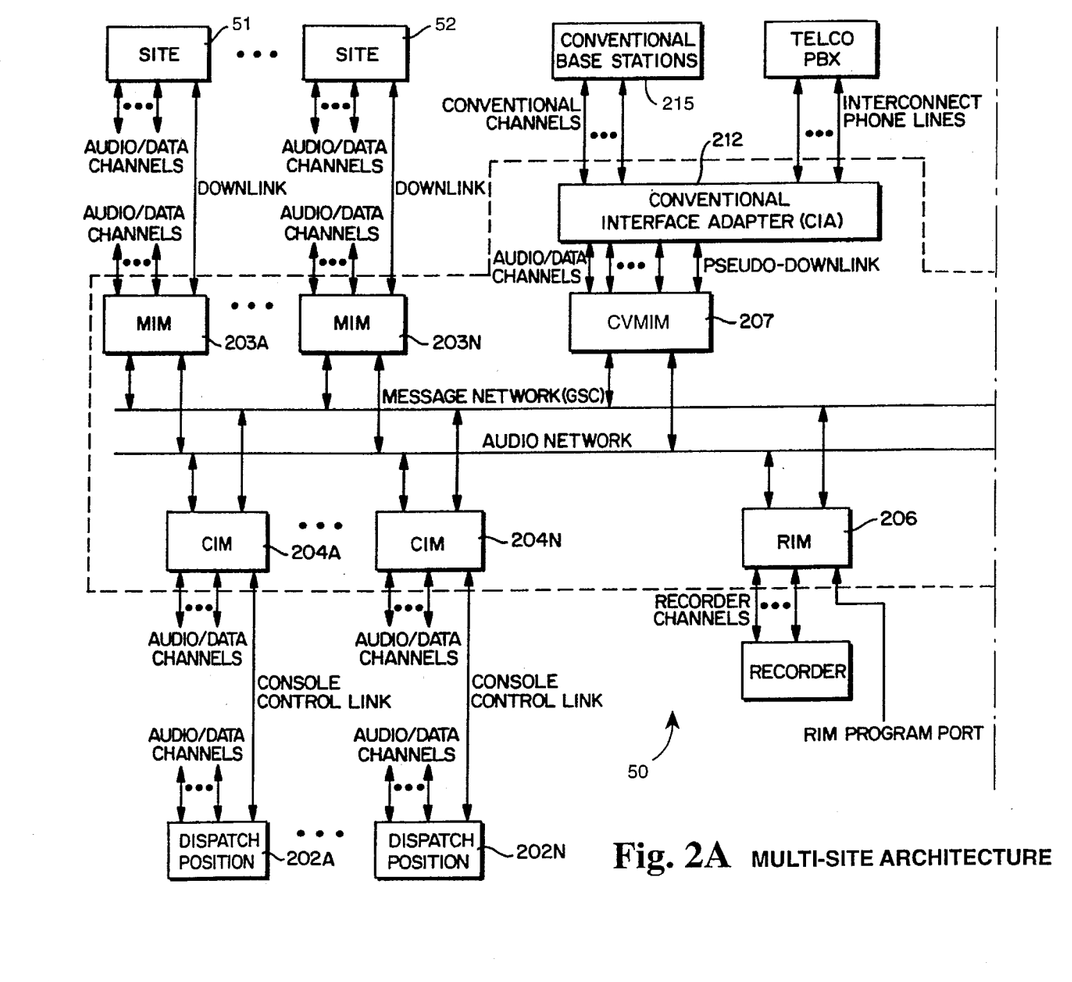
Figure 2B:
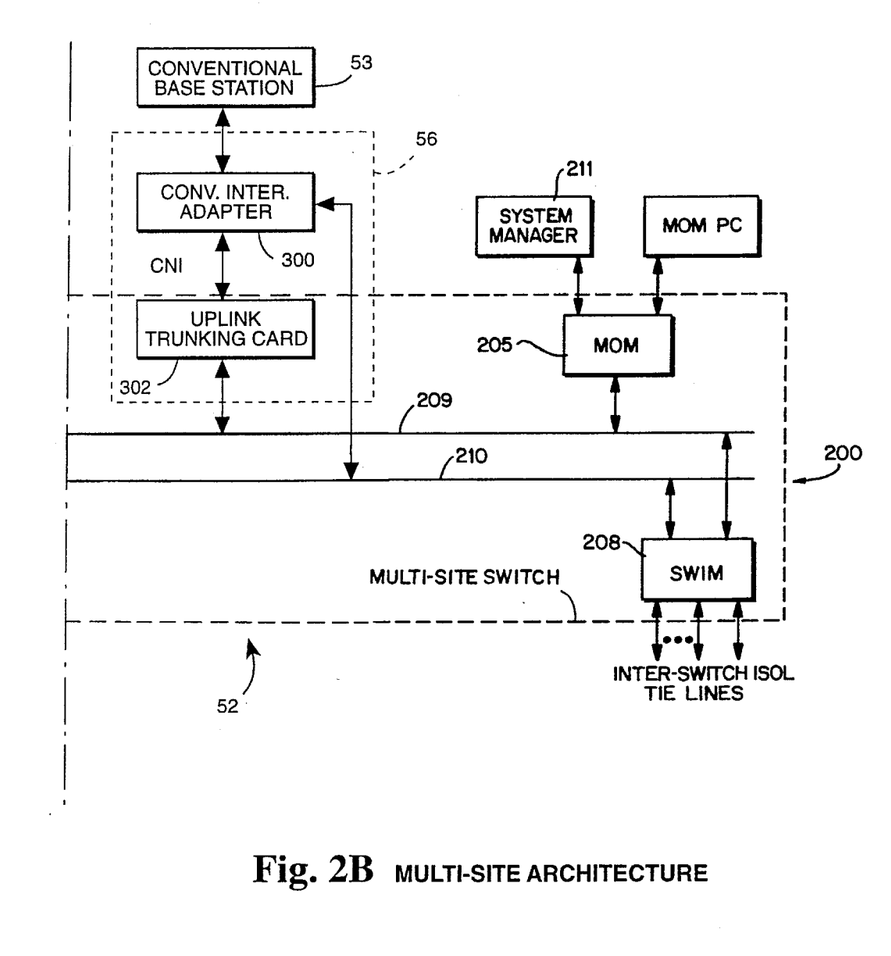

FIG. 2 is a detailed block diagram of multisite switch 52 which also shows a somewhat more detailed block diagram of CNI 56. Multisite switch 52 includes an audio network 210 and a digital message network 209. Digital network 209 comprises a serial digital message bus which propagates control messages (e.g., group channel assignment messages including group IDs) between "MIM" controllers for eventual communication to RF trunking site S1,S2. Audio network 210 in the preferred embodiment comprises a time-division multiplexed PCM bus and associated audio routing cards which permit flexible and versatile distributed routing of PCM audio signals throughout system 50. More details concerning the structure and operation of the architecture shown in FIG. 2 may be found by referring to the copending, commonly-assigned patent applications cited above.

FIG. 2 shows elements 207, 212, and 215 which are described in the copending Guillford et al patent application Ser. No. 07/709,987 filed 4 Jun. 1991 cited above. These features may or may not be present in the same system containing CNI 56 in accordance with the presently preferred exemplary embodiment of this invention. Reference is made to that copending Guillford et al patent application for details concerning the structure and operation of conventional interface adapter 212, CVIM 207, and associated corresponding base stations 215.

Figure 3:
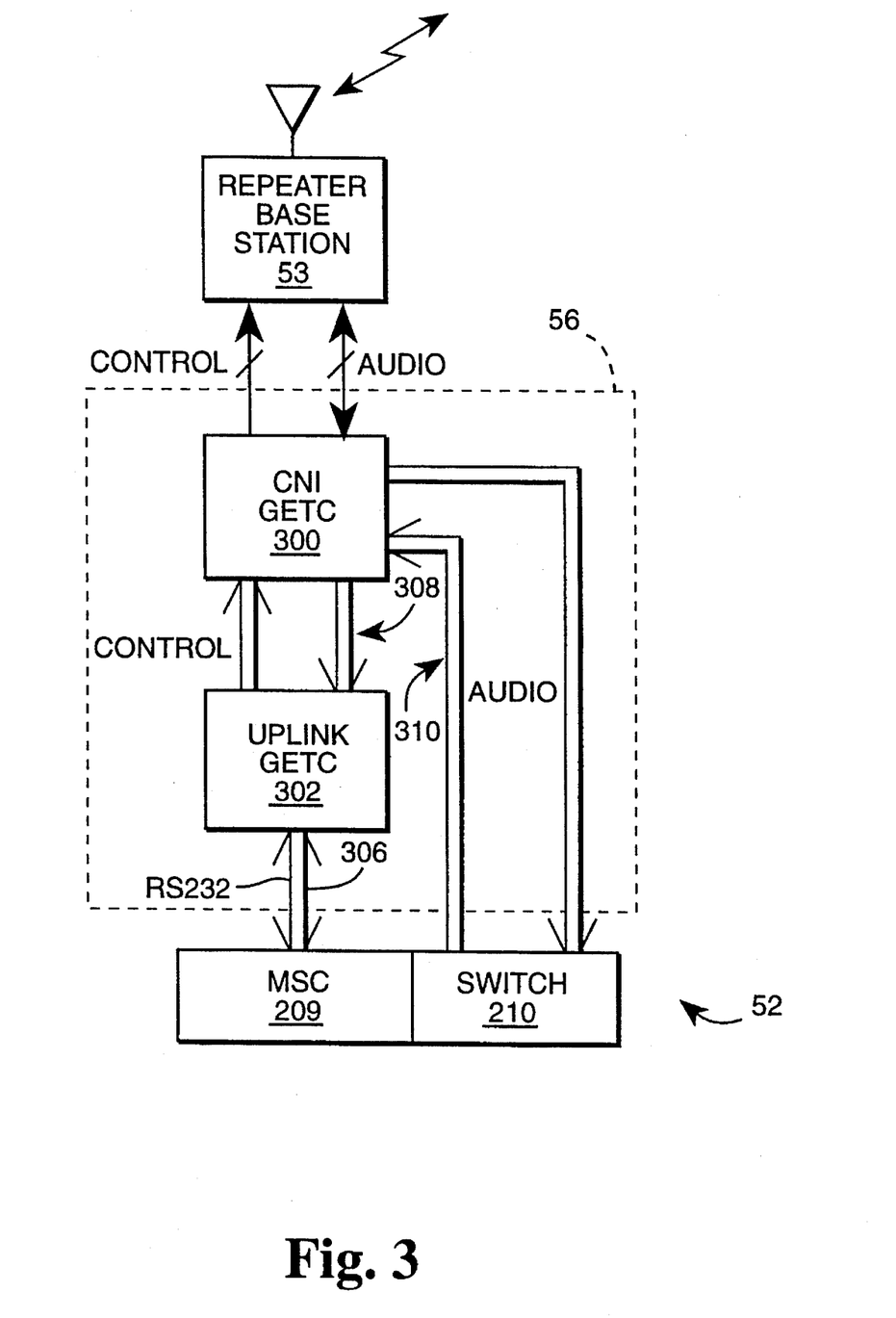
FIG. 3 is a block diagram of the portion of the architecture in FIG. 2A & 2B which provides interfacing between a conventional base station and a multisite digitally-trunked switch in accordance with the presently preferred exemplary embodiment of the present invention.

Referring more particularly now to CNI 56 in conjunction with FIGS. 2 and 3, the CNI in the preferred embodiment includes a conventional interface adapter controller ("GETC") 300 and a conventional uplink trunking card ("GETC") 302. In the preferred embodiment, each of elements 300,302 comprises a processor based card of the type that has been used in EGE's trunking system for several years. Uplink trunking card 302 in the preferred embodiment is well-known and communicates serial digital information bidirectionally to switch message network 209 (and/or a multisite controller—"MSC") via a 19.2 Kbaud RS-232 link. Uplink trunking card 302, in turn, communicates digital control information to and from conventional interface adapter 300 via a 4-wire 9600 baud link 308. Audio network 210 (shown schematically in FIG. 2 as "switch") provides input and output audio to/from conventional network interface 300 (e.g., over dedicated telephone lines, microwave links, etc.). Thus, in the preferred embodiment CNI channel 56 provides a conventional base station S3 connected to a conventional interface adapter 300; a full duplex audio link to multisite switch 52; and a full duplex data link 306 connected to the multisite coordinator/message network 209. The Exemplary arrangement shown in FIG. 1 is configured as a dedicated site S3 connected to the multisite coordinator (switch) through uplink trunking card 302.

Figure 4:
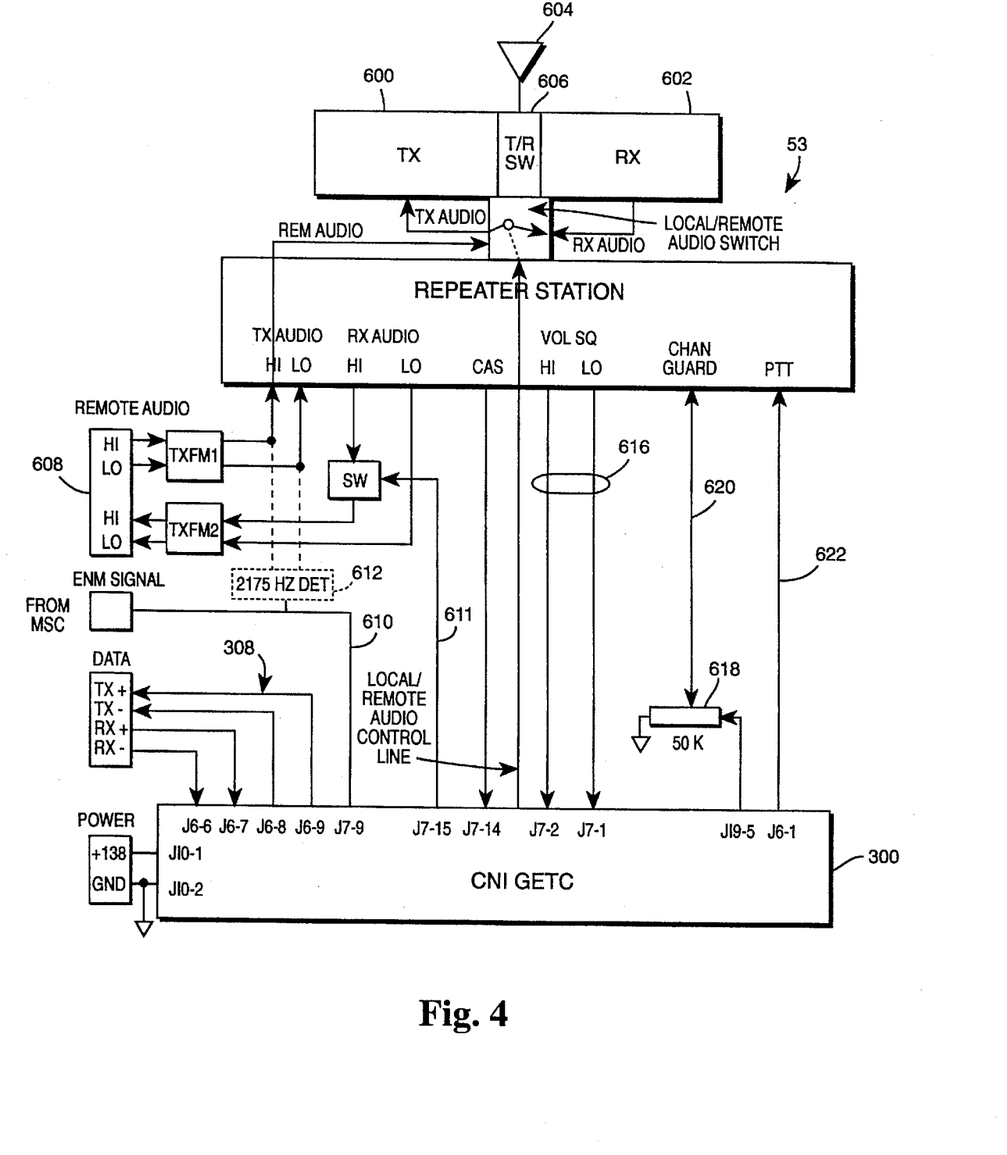
FIG. 4 is a more detailed schematic diagram of interconnections between the repeater base station and the conventional network interface controller shown in FIG. 3.

FIG. 4 is an exemplary schematic diagram of the individual interconnections in the preferred embodiment between conventional interface adapter 300 and base station S3. As shown in FIG. 4, base station S3 includes a conventional transmitting section 600 and a conventional receiving section 602. The transmitter 600 and receiver 602 are selectively alternately coupled to an antenna 604 via conventional T/R switch 606. Base station S3 receives its transmit audio from a remote audio source 608 (which is linked to audio network 210 of network switch 52 whenever the EAM signal is present or whenever 2175 Hz tone is present in the remote audio). Alternatively, conventional interface adapter trunking card 300 may provide audio from the repeater station S3 receiver to the repeater station S3 transmitter of repeater station S3 via line 610. An optional 2175 Hz tone detector 612 may be present to detect if control tone is present in the remote audio (thus permitting either tone or DC levels to control whether repeater S3 is in local or remote repeat mode).

Repeater station S3 provides its received audio to audio network 210 (switch 52) via a remote audio connection 608—and also provides this received audio to conventional interface adapter 300 for subaudible tone decoding via line 616. Conventional interface adapter 300 controls whether the squelch of the base station S3 receiver is open or closed via line 616 (e.g., in response to successful decode of tone signals provided as part of the received audio from repeater station S3 over line 611). A conventional interface adapter 300 provides its generated channel guard tone through a 50 kohn resistor 618 station S3 via a line 620; and controls the transmit/receive mode of the repeater station via a PTT line 622. Conventional interface adapter 300 communicates digital data bidirectionally via a (4-wire) data link 308 to uplink trunking card 302.

Conventional interface adapter 300 performs various functions, perhaps the most interesting of which is to convert between digital control signals it receives from uplink trunking card 302 and the tone control signals required by repeater base station S3 and associated non-trunked transceivers M3. In the preferred embodiment, conventional interface adapter 300 also performs CTCSS tone encoding and decoding for base station S3. Conventional interface adapter 300 may also perform additional functions (e.g., control of a frequency synthesizer within base station S3; and squelch tail elimination). Such functions are performed by the conventional network interface 56 under control of program control instructins (as will be explained in conjunctin with FIGS. 6 and 7).

As described above, there are two basic operations performed by conventional interface in adapter 300 in the preferred embodiment. The first operation is to convert the tone channel guard in a conventional (non-trunked) transmission received by non-trunk base station S3 to a channel assignment message which is then sent to uplink trunking card 302 and on to switch 52. The second operation performed by conventional interface adapter 300 is to convert group channel request messages received by uplink trunking card 302 from switch 52 into a conventional (non-trunked) base station S3 transmission with tone channel guard. Conversions between tone channel guard and group numbers are performed by conventional interface adapter 300 based on a tone channel guard/group number mapping using lookup table 500 shown in FIG. 5. In the preferred embodiment, this lookup table is stored in writable but non-volatile memory and can be reconfigured to meet the customer's needs.

Figure 5:
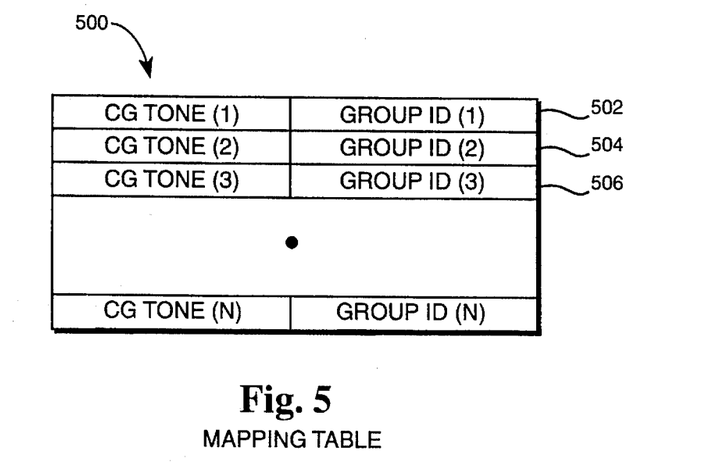
FIG. 5 is a schematic diagram of a group ID-to-tone frequency mapping table provided within the conventional network interface controller of FIG. 3.

In the preferred embodiment, conventional interface adapter 300 supports only group calls (i.e., only group IDs are stored in lookup table 500). It is possible for the conventional interface adapter 300 to support individual transceiver calls based on tone channel guard.

Figure 6:
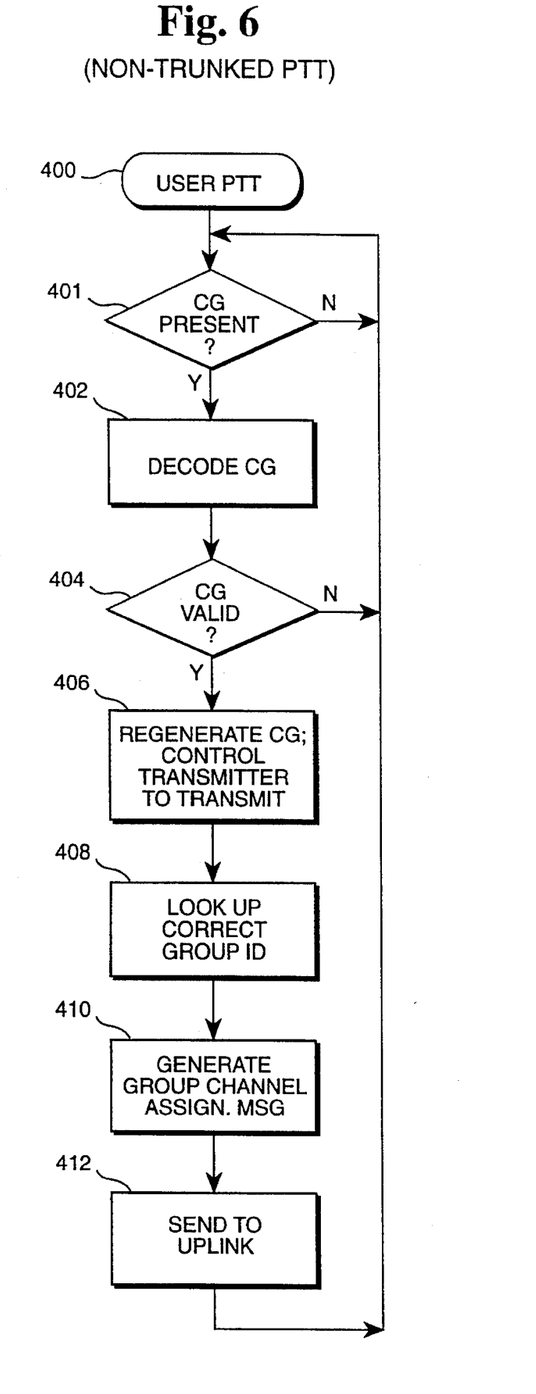
FIGS. 6 and 7 are flowcharts of exemplary program control steps performed by the conventional network interface controller shown in FIG. 3.

FIG. 6 is a flow chart of exemplary program control steps performed by conventional interface adapter 300 in response to receipt of a non-trunked transceiver M3 transmission by non-trunked site S3). When a conventional transmission is received by the conventional interface adapter 300 (e.g, in response to a PTT by a non-trunk user transceiver, block 400), the conventional interface adapter 300 detects and decodes the incoming channel guard frequency (blocks 401, 402). A standard low-speed filter is used to detect a channel guard not present condition in the preferred embodiment.

Channel guard decoding in the preferred embodiment is accomplished by timing the duration between falling edges of an amplitude limited version of the channel guard tone received from the repeater station receiver section 602 discriminator. Every period between falling edges is compared to all possible valid channel periods (in the preferred embodiment, such valid channel guard tones may extend from 67.0 Hz to 192.8 Hz). If a match is found, the filter value for that particular tone is incremented by five. All thirty filter values are decremented by one in every falling edge for damping purposes. All thirty filter values are continuously monitored. Any time a value greater than twenty (five consecutive codes) is detected in the filter value table, a decode is declared for that particular channel guard tone.

Once the conventional interface adapter 300 has successfully decoded a channel guard tone, it then references its lookup table 500 in order to determine whether the decoded tone frequency is authorized (decision block 404). If the decoded subaudible tone frequency is found in lookup table 500, conventional interface adapter 300 begins to regenerate the same subaudible tone; keys base station S3; and permits the base station to begin repeating (with the regenerated subaudible tone) the received audio (block 406). For tone regeneration, the conventional interface adapter 300 loads up a timer interrupt to interrupt at sixteen times the channel guard frequency so as to regenerate the received channel guard tone for base station S3. This regenerated channel guard tone is provided to the base station transmitter 600 for transmission over the RF carrier.

As part of the same referencing to lookup table 500 used to determine whether a valid (i.e., defined) channel guard tone has been decoded, the preferred embodiment conventional interface adapter 300 also determines the decoded tone frequency corresponding to a digital group ID (block 408). In the preferred embodiment, lookup table 500 comprises a two-dimensional array providing correspondence between digital information specifying subaudible tone frequencies and digital information specifying group IDs. When a valid channel guard tone is decoded, conventional interface adapter 300 generates a group channel assignment message (block 410) and sends this group channel assignment message to uplink trunking card for communication over message network 209 (block 412).

Multisite switch 52 in the preferred embodiment treats the generated group assignment message (which conventional interface adapter 300 generates to have the same format as other group assignment messages carried by the switch) in the same way as it handles any other group assignment message provided to it. Thus, the effect of this group channel assignment message is to cause the MSC to send channel request messages to the various RF trunking sites S1 and S2 to ascertain whether any trunked transceivers within the requested group are active in their coverage areas; and if so, to transmit RF channel assignment messages so as to cause such transceivers to move to working channels in order to participate in the communication. Switch 52 also establishes audio routing over audio network 210 in a conventional manner as provided by the multisite switch and associated audio routing components such that audio is routed between base station S3 and any one of trunked base stations S1,S2 having, in their coverage area, trunked transceivers corresponding to the generated group channel request message.

In the preferred embodiment, the channel assignment message generated by the conventional interface adapter 300 includes the information provided by trunked sites S1, S2 in response to channel requests made by trunked mobile transceivers, including for example a logical ID. However, since a calling conventional (non-trunked) user transceiver does not provide any digital ID to conventional repeater S3 in the preferred embodiment, the conventional interface adapter 300 inserts a logical ID ("LID") corresponding into the channel assignment message it provides to the multisite switch. Thus, in the preferred embodiment, channel assignment messages generated by conventional interface adapter 300 appear as if they are generated by a single trunked RF transceiver having the logical ID corresponding to the logical ID used by the conventional interface adapter.

Figure 7:
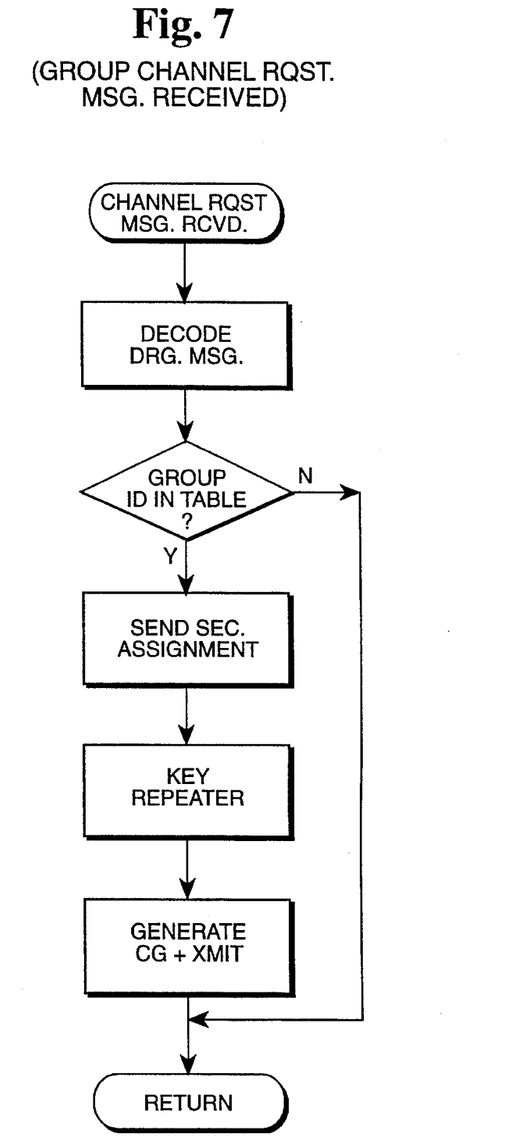

FIG. 7 is a flow chart of exemplary program control steps performed by conventional interface adapter 300 in response to receipt of group channel request messages (via uplink trunking card 302) from message network 209. When a group channel message request is received (block 450 shown in FIG. 7), the conventional interface adapter 300 decodes the group ID contained within the message and compares it with the group ID information stored within its lookup table 500 (blocks 452,454). If there is no correspondence, the conventional interface adapter 300 takes no further action (i.e., ignores the message). However, if the received group ID corresponds to an entry in its lookup table 500, conventional interface adapter 300 obtains the tone frequency information corresponding to this received group ID from the lookup table (block 456); generates a corresponding channel guard subaudible audio tone; and provides this tone (along with appropriate control signals) to cause conventional base station S3 to transmit the tone over its RF carrier (block 458). Conventional interface adapter 300 also receives audio routed by switch 52 to the conventional base station such that signals associated with the ongoing trunked group communication will be received via non-trunked site S3 by non-trunked RF transceivers responding to the subaudible tone (and so that any audio transmitted by such non-trunked transceivers will also be placed on the audio network 210 for communication to the associated trunked RF transceivers over trunked sites S1,S2).

The fact that conventional interface adapter 300 in the preferred embodiment is a one-channel site implies that the conventional interface adapter can process only one conversation at any time. When the conventional interface adapter 300 is actively handling a call as a gateway between the non-trunked base station S3 and the trunked switch 52), mobile call requests and conventional transmissions will be ignored by the interface adapter (except for console preempts). When the current call is preempted by the console, voice audio will be routed between the console and the receiving conventional radio. The originating radio unkey will not drop the call as long as the console is still keyed. Console unkey, however, will drop the call regardless of the status of the originator radio.

Since base station S3 is a single channel system, other conventional transmission on the same frequency (but using a different channel guard frequency) will most likely interfere with the current call. As the result of this interference, a current trunk call may be inadvertently dropped. Therefore, care should be taken to avoid any overlapping conventional transmissions. This implies that non-trunked site S3 should not be expected to handle heavy traffic if it serves two or more subsets of non-trunked transceivers using different channel guard tones (e.g., M3A, M3B).

The conventional interface adapter 300 may also support DTMF telephone calls to a conventional telephone interface system based on tone channel guard. The conventional interface adapter 300 may simply receive a channel guard tone marked for "special call", and then send special call block 0 to the telephone interface system to specify DTMF dialing.

While conventional interface adapter 300 may be said to emulate certain functions and behaviors of a digitally trunked transceiver and associated site, it is limited by the amount of information it can pass to its associated non-trunked transceivers.

In the preferred embodiment, interface adapter 300 may perform certain tasks in addition to the ones discussed above, including base station S3 synthesizer loading and squelch tail elimination. For example, if base station S3 is an EGE synthesized MASTR II station, conventional interface adapter 300 may be used to load the synthesizer of the base station in order to set desired operating frequencies. Synthesizer data may be read out of a personality EEPROM within conventional interface adapter 300 and loaded into the synthesizer (e.g., at power up). Synthesizer lock is always monitored by the conventional interface adapter 300; if the synthesizer should come unlocked, the conventional interface adapter attempts to reload the synthesizer until locked condition is achieved.

Once the end of channel guard tone transmission (or an unkey request is detected), the conventional interface adapter 300 stops the channel guard tone generation (keeping the transmitter active for another 200 ms before unkeying the transmitter). This action eliminates squelch tail at the non-trunked user transceivers.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed:

1. In a radio frequency (RF) communication system including (a) at least one digitally trunked RF repeater which transmits a selected one of plural digital ID codes over the air to identify an associated selected one of a plurality of digitally trunked RF transceivers, and (b) at least one tone-based RF repeater which transmits a selected one of plural predetermined signalling tones over the air to identify an associated selected one of a plurality of tone-controlled RF transceivers, a method for providing communications between said trunked RF transceivers and said tone-controlled RF transceivers including the steps of:

(a) establishing correspondence between said selected one of said plural digital ID values and said selected one of said plural predetermined signalling tones, (b) transmitting said selected one digital ID value with said digitally trunked RF repeater to call said selected one of said plurality of digitally trunked RF transaceivers, (c) transmitting said selected one predetermined signalling tone with said tone-based RF repeater to call said selected one of said plurality of tone-controlled RF transceivers, and (d) establishing a communications path between said digitally trunked RF repeater and said tone-based RF repeater to allow communications between said called digitally trunked RF transceiver and said called tone-controlled RF transceiver, 2. A method as in claim 1 wherein said plural predetermined signalling tones are subaudible.

3. A method as in claim 1 wherein said plural predetermined signalling tones comprise CTCSS selective squelch tones which have the effect of opening the squelch of said tone-controlled RF transceivers.

4. A digitally trunked radio frequency (RF) communications system including at least one digitally trunked RF transmitting arrangement communicating digital signals to plural digital radio transceivers over at least one trunked RF communications channel, said system for integrating plural tone-based RF transceivers into said trunked RF communications system, said system including:

tone receiving/recognizing means for receiving and recognizing signalling tones transmitted by at least one of the plural tone-based RF transceivers;

at least one tone-based radio transmitter for transmitting, over the air in response to signalling tones received and recognized by said tone receiving/recognizing means, radio messages including signalling tones to call corresponding ones of the plural tone-based RF transceivers; and a memory specifying correspondence between at least one of said received and recognized signalling tones and at least one digital transceiver ID identifying at least one of said plural digital radio transceivers;

wherein said digitally trunked RF transmitting arrangement is coupled to said memory, said digitally trunked RF transmitting arrangement for transmitting a digital channel assignment radio message specifying said digital transceiver ID corresponding to signalling tones received and recognized by said tone receiving/recognizing means over said trunked RF communications channel.

5. In a digitally trunked RF communications system including plural digitally trunked RF transmitting sites communicating digital signals to plural digital radio transceivers via at least one trunked RF channel, an interface arrangement for integrating a non-trunked RF base station into said digitally trunked RF communications system, said interface arrangement including:

digital messaging means for (a) receiving, from at least one of said plural digitally trunked RF transmitting sites, a digital trunked channel request message specifying a digital transceiver ID identifying one of said plural digital radio transceivers and for (b) transmitting a digital trunked channel assignment message specifying said digital transceiver ID over the air;

a memory specifying correspondence between said digital transceiver ID and at least one non-trunked identification signal; and non-trunked identification signal generating means coupled to said messaging means and to said memory for providing a non-trunked identification signal corresponding to said received digital transceiver ID so as to establish correspondence between (a) said one of said plural digital radio transceivers identified by said channel assignment message, and (b) at least one no-trunked radio transceiver, and for causing said non-trunked RF base station to transmit said provided non-trunked identification signal to call said non-trunked radio transceiver in response to receipt of said digital trunked channel request message.

6. An interface arrangement as in claim 5 wherein said provided non-trunked identification signal comprises at least one subaudible signalling tone.

7. An interface arrangement as in claim 5 wherein said memory stores information representing a plurality of digital transmitter IDs identifying a corresponding plurality of different groups of digital radio transceivers, and a corresponding plurality of associated signalling tones identifying a corresponding plurality of different groups of non-trunked radio transceivers.

8. An interface arrangement as in claim 5 wherein said memory specifies a sequence of plural signalling tones corresponding to said received digital transceiver ID, and said non-trunked identification signal generating means generates said sequence of plural signalling tones.

9. An interface arrangement as in claim 5 wherein said memory specifies predetermined tone frequencies corresponding to said received digital transceiver ID, and said non-trunked identification signal generating means generates said at least one signalling tone based on said predetermined frequencies.

10. An interface arrangement as in claim 5 wherein said memory specifies correspondence between a set of predetermined tone frequencies and a corresponding set of predetermined transceiver digital identification codes.

11. An interface arrangement as in claim 4 wherein said signalling tones are subaudible.

12. An interface arrangement as in claim 4 wherein said memory specifies whether said received signalling tones are valid.

13. An interface arrangement as in claim 4 wherein said memory specifies correspondence between a set of predetermined tone frequencies and a corresponding set of predetermined digitally-encoded transceiver IDs.

14. A method as in claim 1 further including allowing said digitally trunked RF repeater to communicate digitally with said tone-based RF repeater over a multisite switch.

15. A method as in claim 1 further including retransmitting received RF signals with said tone-based RF communication repeater.

16. A method as in claim 1 further including retransmitting received RF signals with said digitally trunked RF repeater.

17. A method as in claim 1 further including concurrently receiving plural different conversations over a plurality of corresponding trunked RF communications channels with said digitally trunked RF communication repeater, and retransmitting a selected one of said plural different received conversations with said tone-based RF communication repeater.

18. A method as in claim 17 further including selecting a one of said plural different conversations to retransmit with said tone-based RF communication repeater in response to a received digital ID value.

19. A RF communications system for permitting a group of plural digitally controlled RF transceivers to communicate with a group of plural tone controlled RF transceivers, said system including:

a first RF repeater which (a) transmits a predetermined digital identification code over the air for receipt by said group of digitally controlled RF transceivers in order to cause said group of digitally controlled RF transceivers to operate temporarily on a trunked radio communications channel, (b) receives, over the air, said predetermined digital identification code and associated first communicated signals from said group of plural digitally controlled RF transceivers, and (c) applies said received predetermined digital identification code and associated first communicated signals to a communications link;

said communications link for routing signals between said first RF repeater and a second RF repeater;

said second RF repeater coupled to said communications link for (a) transmitting tone signalling and associated communicated signals to said group of plural tone controlled RF transceivers over the air, and (b) receiving, over the air, at least one predetermined digital identification tone and associated second communicated signals from said group of tone controlled RF transceivers; and an interface arrangement, coupled between said first RF repeater and said second RF repeater via said communications link, for establishing a supergroup containing said group of plural digitally controlled RF transceivers and said group of plural tone-controlled RF transceivers by applying said predetermined digital identification code and said associated second communicated signals to said communications link in response to receipt of said predetermined identifying tone by said second RF repeater, and controlling said second RF repeater to transmit said predetermined identifying tone and said associated first communicated signals to said group of plural tone controlled RF transceivers in response to receipt by said first RF repeater of said predetermined identifying digital code applied to a multisite switch.

20. In a digitally trunked RF communications system, a method for permitting a first group of digitally trunked RF transceivers to communicate with a second group of tone controlled RF transceivers said method comprising the following steps:

(a) receiving, over the air via a radio message, a predetermined digital identification code from said first group of digitally trunked RF transceivers;

(b) applying said received predetermined digital identification code to a digital network;

(c) monitoring said digital network for appearance of said predetermined digital identification code; and (d) calling a supergroup including said first group of digitally trunked RF transceivers and said second group of tone controlled RF transceivers by (i) transmitting an RF message containing said predetermined digital identification code over the air to control said first group of digitally trunked RF transceivers to begin operating temporarily on a predetermined trunked radio channel, (ii) transmitting a RF message over the air including a predetermined identifying tone to control said second group of tone controlled RF transceivers to begin actively receiving radio messages in response to monitored appearance of said predetermined digital identification code on said digital network, and (iii) transmitting common signals to said first group of digitally trunked RF transceivers and to said second group of tone controlled RF transceivers.

21. A method as in claim 20 further including:

(e) receiving, over the air via a RF message, said predetermined identifying tone from said second group of tone controlled RF transceivers;

(f) applying said predetermined digital identification code to said digital network in response to receipt of said predetermined identifying tone by said receiving step (e); and (g) transmitting said predetermined digital identification code over the air to call said first group of digitally trunked RF transceivers in response to said predetermined digital identification code applied to said digital network by said step (f).

22. In a digitally trunked RF communications system, a method for permitting a first group digitally trunked RF transceivers operating on a first RF channel to communicate with a second group of tone controlled RF transceivers operating on a second RF channel, said method comprising the following steps:

(a) receiving, over the air via said second R/F channel, a predetermined identifying tone from said second group of tone controlled RF transceivers;

(b) applying a predetermined digital identification code to a digital network in response to receipt of said predetermined identifying tone by said receiving step (a);

(c) monitoring said digital network for appearance of said predetermined digital identification code; and (d) (i) transmitting said predetermined identifying tone over the air to call said second group of tone controlled RF transceivers, (ii) transmitting said predetermined digital identification code over the air to call said first group of digitally trunked RF transceivers in response to appearance of said predetermined digital identification code on said digital network, and (iii) transmitting common signals to said first group of digitally trunked RF transceivers over said first channel and to said second group of tone controlled RF transceivers over said second channel.

23. A method of communicating over the air with first and second radio transceivers comprising the following steps:

(a) establishing a correspondence between a first radio transceiver and a second radio transceiver; and (b) calling both said first radio transceiver and said second radio transceiver whenever a call is to be initiated to either of said first and second radio transceivers, including the steps of:

(1) transmitting trunking control signals to said first radio transceiver to cause said first radio transceiver to move to and begin operating on a trunked radio communications channel, (2) transmitting receiver enabling signals to said second radio transceiver over a non-trunked radio communications channel to cause said second radio transceiver to begin actively receiving radio signals on said non-trunked radio communications channel, and (3) transmitting common signals to said first radio transceiver over said trunked radio communications channel and to said second radio transceiver over said non-trunked radio communications channel.

* * * * *